(12) United States Patent
Boreczky et al.

(10) Patent No.: US 7,401,351 B2
(45) Date of Patent: Jul. 15, 2008

(54) SYSTEM AND METHOD FOR VIDEO NAVIGATION AND CLIENT SIDE INDEXING

(75) Inventors: John Boreczky, San Leandro, CA (US); Andreas Girgensohn, Menlo Park, CA (US); Lynn Wilcox, Palo Alto, CA (US); William N. Schilit, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1101 days.

(21) Appl. No.: 09/738,905

(22) Filed: Dec. 14, 2000

(65) Prior Publication Data

US 2002/0075572 A1  Jun. 20, 2002

(51) Int. Cl.
*H04N 7/173* (2006.01)

(52) U.S. Cl. .............................. 725/88; 725/89; 725/90; 725/93

(58) Field of Classification Search ............. 725/86–95; 345/721, 723–725
See application file for complete search history.

(56) References Cited

U.S. PATENT DOCUMENTS

| 5,136,655 | A * | 8/1992 | Bronson ..................... 704/270 |
| 5,818,439 | A | 10/1998 | Nagasaka et al. |
| 5,884,056 | A * | 3/1999 | Steele ........................ 345/738 |
| 6,222,532 | B1 * | 4/2001 | Ceccarelli ................... 345/723 |
| 6,366,296 | B1 | 4/2002 | Boreczky et al. |
| 6,711,741 | B2 * | 3/2004 | Yeo ............................ 725/87 |
| 6,721,490 | B1 * | 4/2004 | Yao et al. ...................... 386/69 |

OTHER PUBLICATIONS

U.S. Appl. No. 09/266,637, filed Mar. 11, 1999, Foote et al.
U.S. Appl. No. 09/267,529, filed Mar. 12, 1999, Uchihashi et al.
U.S. Appl. No. 09/322,842, filed May 28, 1999, Girgensohn et al.
U.S. Appl. No. 09/611,389, Chiu et al.
Arman, F., et al., "Content-based Browsing of Video Sequences," In *Proceedings of the 6th ACM International Conference on Multimedia*, San Francisco, California (1994) pp. 97-103.
Borecxky, J., et al., "Comparison of Video Shot Boundary Detection Techniques," In *Storage and Retrieval for Still Image and Video Databases IV, Proc. SPIE 2670*, San Jose, California (1996) pp. 170-179.

(Continued)

*Primary Examiner*—Hunter B. Lonsberry
(74) *Attorney, Agent, or Firm*—Fliesler Meyer LLP

(57) ABSTRACT

A system is provided where a number of representative video snapshots are displayed on a timeline indicating a position to jump to in a video using control buttons, such as fast forward, reverse, or a timeline scroll bar. The video snapshots are obtained by opening a low resolution connection to a video server to receive forward looking video segments. The forward looking video segments are summarized and the representative video snapshots are selected and displayed to provide a reference frame for the user to select a timeline position, or snapshots directly linked to positions in the higher resolution video. Backward looking video segments may be similarly summarized from the low resolution connection, or alternatively from video previously played. As the video progresses, new forward looking video segments are received and new representative video snapshots are summarized and displayed in close proximity with the video being played.

20 Claims, 7 Drawing Sheets

OTHER PUBLICATIONS

Boreczky, Jr., et al., "A Hidden Markov Model Framework for Video Segmentation Using Audio and Image Features," *In Proc. ICASSP '98, IEEE*, Seattle, Washington (May 1998) pp. 3741-3744.

Girgensohn, A., et al., "Time-Constrained Keyframe Selection Technique," *In IEEE Multimedia System '99, IEEE Computer Society*, vol. 1, (1999) pp. 756-761.

Girgensohn, A., et al., "Facilitating Video Access by Visualizing Automatic Analysis," *In Human-Computer Interaction Interact '99, IOS Press*, (1999) pp. 205-212.

Taniguchi, Y. et al., "An Intuitive and Efficient Access Interface to Real-Time Incoming Video Based on Automatic Indexing," *In Proc. ACM Multimedia 95*, San Francisco, California (1995) pp. 25-33.

Tonomura, Y., et al., "VideoMap and VideoSpaceIcon: Tools for Anatomizing Video Content," *In Proc ACM INTERCHI '93*, Apr. 1993, pp. 131-136.

Uchihashi, S., et al., "Summarizing Video Using a Shot Importance Measure and Frame-Packing Algorithm," *In Proc ICASSP '99*, vol. 6 (1999) pp. 3041-3044.

Ueda, H., et al., "Impact: An Interactive Natural-motion-picture Dedicated Multimedia Authoring System," *In Proceedings of CHI, 1991, New Orleans, Louisiana, ACM*, (Apr.-May 1991) pp. 343-350.

Yeung, M.M., et al., "Video Visualization for Compact Presentation and Fast Browsing of Pictorial Content," *In IEEE Transactions on Circuits and Systems for Video Technology*, vol. 7, No. 5 (Oct. 1997) pp. 771-785.

Zhang, H.J., et al., "Video Parsing, Retrieval and Browsing: An Integrated and Content-Based Solution," *In Proc. Multimedia '95, ACM Press*, pp. 15-24.

Chiu, P., et al., "A Genetic Algorithm for Video Segmentation and Summarization," *In Proceedings of IEEE International Conference on Multimedia and Expo*, vol. III, pp. 1329-1332 (2000).

Chiu, P., et al., "A Genetic Segmentation Algorithm for Image Data Streams and Video," *In Proceedings of the Genetic and Evolutionary Computation Conference, Morgan Kaufmann Publishers* pp. 666-673 (2000).

\* cited by examiner

SYSTEM AND METHOD FOR VIDEO NAVIGATION AND CLIENT SIDE INDEXING

BACKGROUND OF THE INVENTION

1. Field of the Invention

This invention relates to access and finding a position in video or other data streams. The invention is more particularly related to referencing a position within the data stream to a portion of the data stream that serves as a reference marker. The invention is still further related to building reference markers from a low resolution data stream to reference positions in a full or higher resolution data stream. The invention is more particularly related to a video navigation and building timeline markers to reference positions in a video data stream.

2. Discussion of the Background

Modern video playback devices include features for positioning a point in the video for viewing, including any of fast forward, reverse, etc. FIG. 1 illustrates a conventional video playback device 100 that includes a video display area 102. A timeline 105 shows a current position of the video being displayed, and standard VCR controls, including play 115, Fast Rewind 120, Fast Forward 125, Step Back 130, Step Forward 135, etc., are provided. Any of the standard VCR controls may be utilized to position the current video playback point, or a user may drag the playback point button on the timeline to find a position in the video. However difficulties arise in finding specific positions within a video.

Some systems solve the problem of finding positions in a video by providing, in addition to a video flow, various snapshots extracted from specific points in the video. These snapshots are utilized to provide reference markers to the video position from which the snapshots were extracted.

FIG. 2 illustrates a conventional video playback mechanism having snapshots that reference positions in a video being played back. If a user wants to jump forward, the snapshots provide a frame of reference from which the user can select a position in the video. If a snapshot shows a particular scene the user is interested in, the user simply moves the playback point slide control knob on the timeline to a position associated with that snapshot. If the scene a user is interested in is not shown, the user may simply use a related scene to judge a position to begin a search for the desired scene.

Video clips, movies, and television programs are now increasingly being made available over networked devices including the Web. Often, such media is made available in a streaming format. Streaming formats begin sending the video, and a user beings playing the received video stream before an entire video is received.

Generally, streaming playback devices include the same standard VCR controls as found in typical video playback devices. However, most video provided today does not include indexed snapshots that allow a user to easily identify and select portions of video for viewing.

SUMMARY OF THE INVENTION

The present inventors have realized that playback devices can be made more user friendly by providing "snapshots" to reference positions within a data stream being played, even if indexed snapshots are not provided in the original data stream. The present inventors have also realized that Web based applications can reduce bandwidth consumption by providing indexed snapshots into data streams being played by a user. Roughly described, the present invention provides a low resolution connection to a device that is providing a data stream to a user. The low resolution connection provides look ahead data which is used to capture snapshots and determine indexes into the data stream being provided. A time line of the data stream may be provided that includes the captured snapshots as references to specific portions of the data stream, allowing a user may easily select portions of the data stream. The invention is particularly related to video streaming devices used over the Web, however, the invention may be practiced using any type of playback device, for any of video, audio, scientific, or other types of data.

The invention includes a method, comprising the steps of, opening a main connection for receiving transmissions of a data flow, opening a second connection for transmission of at least one look-x data stream comprising data from said data flow, indexing at least one point of the look-x data stream to at least one corresponding point in said data flow, and providing control of a playback position of said data flow based on the indexed look-x points. The invention is best applied to video data streams, with the look-x points being frames of the video data stream, and includes a control mechanism that correlates positions in the video stream to the indexed look-x points.

Instead of watching videos sequentially, many users like to jump from one point of interest to the next until they find the area they are really interested in. The present invention provides a method to support users in quickly navigating a video. In one embodiment, a small number of index points are determined that the user can jump to with simple mouse clicks. Unlike customary skip forward/backwards buttons, the present invention provides images of the points users can jump to so that they can make a quick initial judgement without having to jump. A predetermined number of images (e.g., two or four) show the index points in the neighborhood of the current playback position. During video playback, the images change so that the index points directly before and after the current position are depicted and accessible.

BRIEF DESCRIPTION OF THE DRAWINGS

The present invention will be described with respect to particular embodiments thereof, and references will be made to the drawings in which.

DESCRIPTION OF THE PREFERRED EMBODIMENTS

Figure 1:
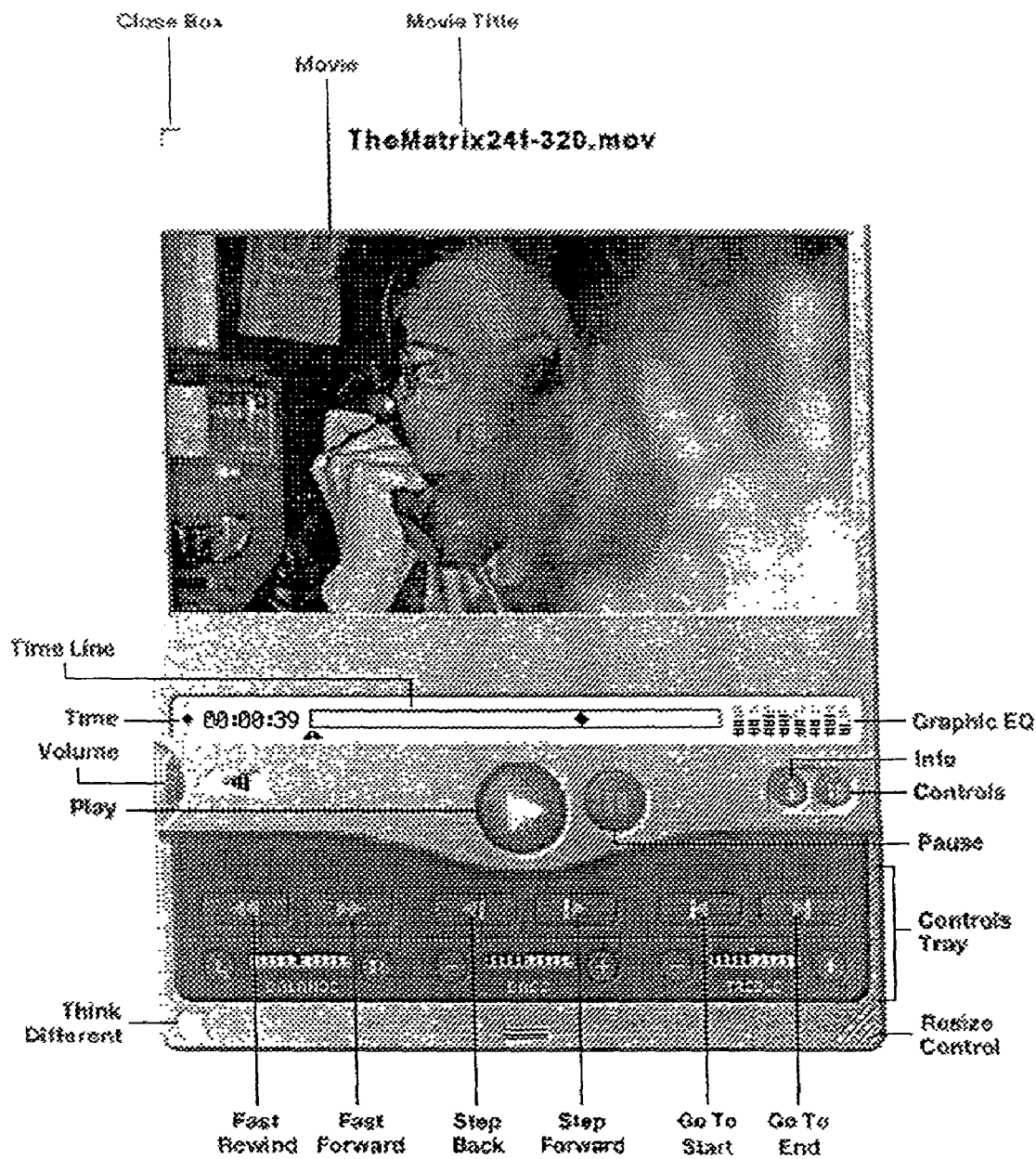
FIG. 1 is a screenshot of a conventional video playback device.
Figure 2:
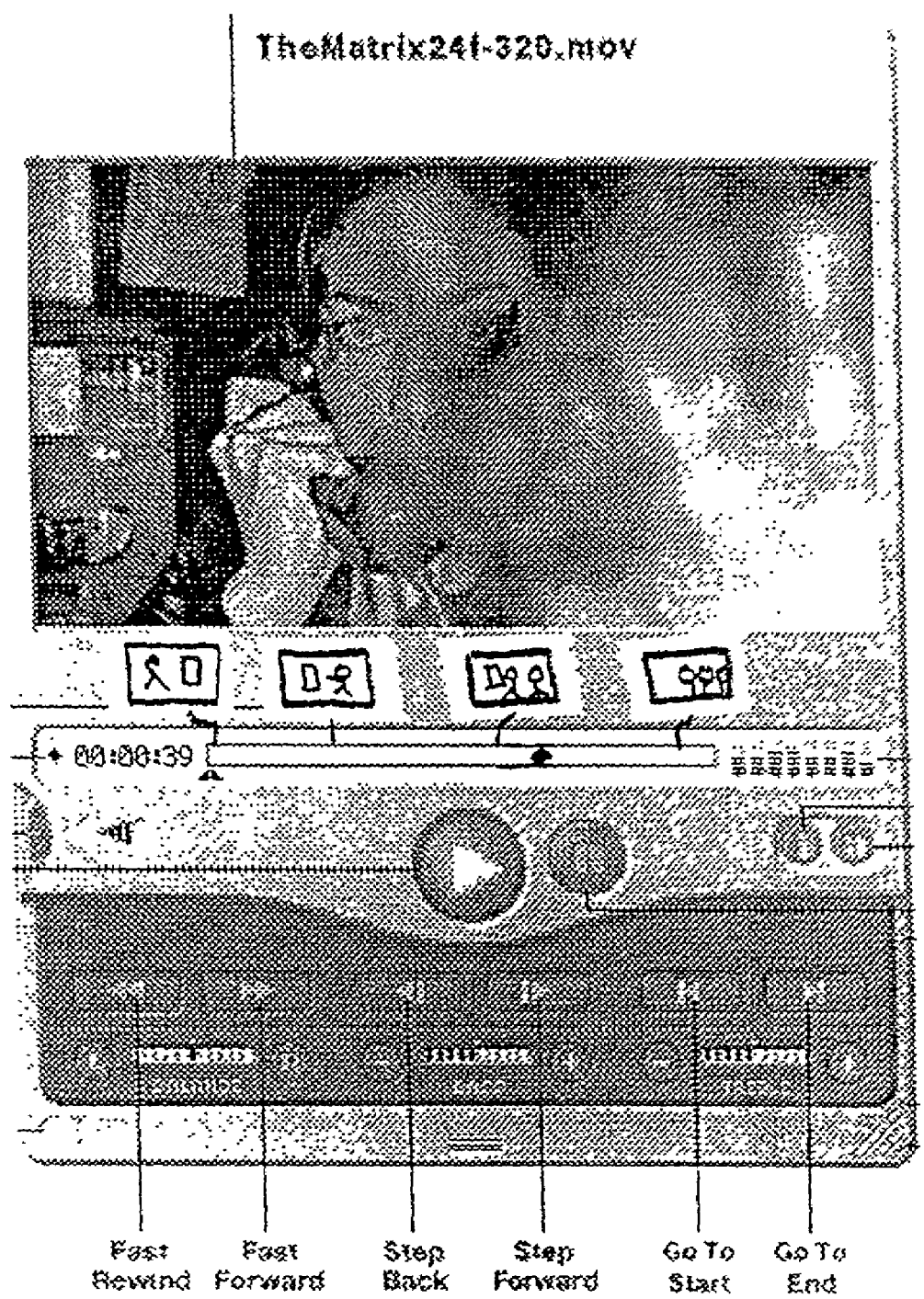
FIG. 2 is a screen shot of a conventional video playback device with snapshots indexed into the video being played back.

In streaming video applications, videos will often be indexed on the server-side and the index points together with their associated images will be available to the client. However, as is the case with the majority of the video content available on the Internet, no server-side index exists. The present invention creates an index on-the-fly on the client side. For creating such an index, the client opens one or more streaming video connections in addition to a main connection used for playing back the video. In cases where a streaming video is encoded for different bandwidths, the additional connection or connections can use a low quality version of the video stream (e.g., reduced frame size, reduced resolution, reduced color, gray scale, black and white, and reduced frame rate, etc.) because only low frame rates and image dimensions are required. The additional connection or connections receive the video from a position that is sufficiently far forward from the current playback position of the main playback stream so that index points in the future can be determined. Index points in the past can be determined from the main video stream, or an additional connection may be opened to retrieve video from positions previous to the current playback position.

For determining index points, a variety of approaches can be taken. For example, Boreczky. J. and Wilcox, L. "A Hidden Markov Model Framework for Video Segmentation Using Audio and Image Features", in *Proc ICASSP '98*, IEEE, May 1998, Seattle.; Boreczky, J. and Rowe, L. "Comparison of Video Shot Boundary Techniques". Proc. SPIE Storage and Retrieval for Image and Video Databases IV, San Jose, Calif., 1996; and Zhang, H. J., Low, C. Y., Smoliar, S., Wu, J. H. "Video Parsing, Retrieval, and Browsing: An Integrated and Content-based Solution", Proc. Multimedia '95, ACM Press, pp. 15-24, each of which are incorporated herein by reference in their entirety. Each of the above provide various tools for determining index points. Any of the above or other methods for determining the index points may be applied. However, such approaches might provide many more index points than desired by the users. Girgensohn, A. and Boreczky, J. "Time-Constrained Keyframe Selection Technique". In IEEE Multimedia Systems '99, IEEE Computer Society, vol. 1, pp. 756-761, 1999 and Uchihashi, S. and Foote, J., "Summarizing Video Using a Shot Importance Measure and a Frame-Packing Algorithm," in Proc. ICASSP '99, Vol. 6, pp. 3041-3044, 1999 have proposed different methods for determining key frames that can be used as index points. In addition, the approach described in Chiu, P., Girgensohn, A., Polak, W., Rieffel, E., Wilcox, L. "A Genetic Algorithm for Summarizing Image Document Streams and Video Keyframe Selection", FXPAL-IP-99-010 is particularly suitable here because it can determine index points from streaming video.

In order to provide forward and backward navigation functions, the video segments around the current playback position must be known. Segments before the current position can be determined during playback so that it is easy to jump back to points that were shown earlier. With just a single video stream and no means to access the video file, it is not possible to determine segments after the current playback position. The second streaming connection to the server that points to a later point in the video than the current playback position. As discussed above, the second connection is used both for the video indexing and the extraction of keyframes to be displayed. The second streaming connection can be of a lower quality if the server provides streams of different quality. For example, a stream with a lower frame rate and a lower image resolution is sufficient for video indexing and keyframe extraction.

Figure 3:
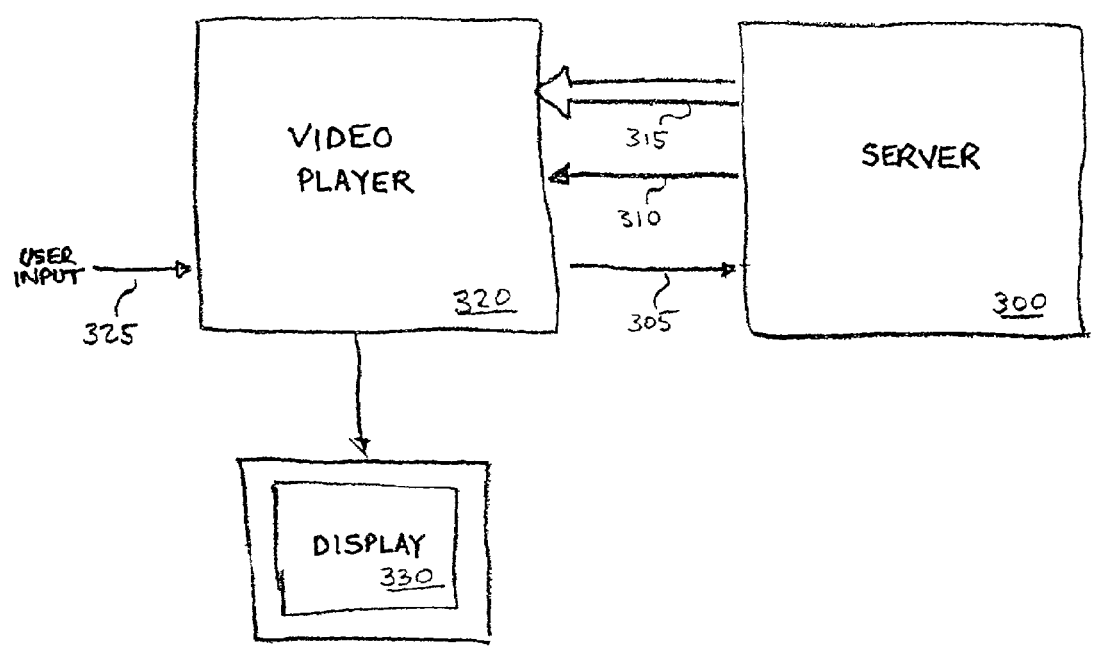
FIG. 3 is a block and information flow diagram of one embodiment of a device according to the present invention.

FIG. 3 is a block diagram and data flow chart of one embodiment of the device according to the present invention. User inputs 325 are entered into the device 320. The user inputs include commands required for invoking an application to play a video stream or other data, and for the control of a playback position of the video stream, and any other inputs required by the application which is running on the device 320. A server device 300 accepts commands 305 from the application of device 320 for commands such as "START A PARTICULAR VIDEO," "JUMP FORWARD," "SKIP BACK," "FAST FORWARD," etc. The server device 300 begins streaming the requested video 315 to the device 320.

To perform video indexing at points after the current playback position of the video stream 315, the device 320 opens a second connection 310 for transmission of look-ahead data of the video stream 315. Device 320 receives the look-ahead data 315, which is summarized, and keyframes are selected and utilized by the device 320 for making a display according to the present invention, having index video at points forward and behind a current playback position of the video stream 315. A user interface including the video being played back is displayed on a display device 330.

As discussed above, the look-ahead connection 310 may be a single connection or multiple connections representing multiple look-ahead points and/or one or more look-behind points. Alternatively, look-behind points may not be needed, particularly if the video stream 315 was started at a beginning of the video, and the video had not been jumped ahead by a user such that all data previous to the current playback position has already been presented to the device 320. The previous data is then summarized and indexed and utilized to display the look-behind points, if any.

Figure 4:
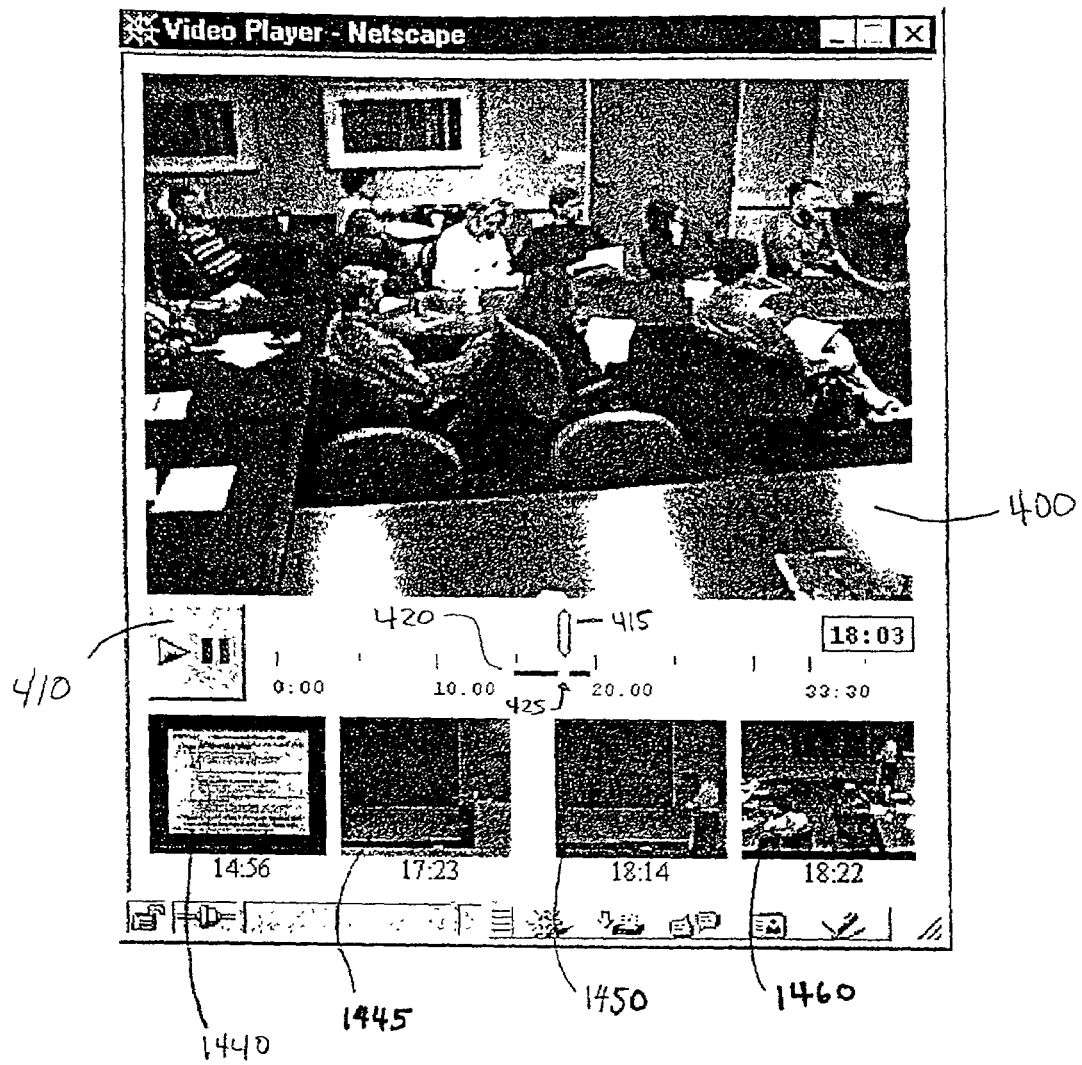
FIG. 4 is a screenshot of an embodiment of the present invention during playback of a video.

FIG. 4 is a screen shot of an embodiment of the present invention during playback of a video, such as a video invoked by commands 325 and displayed on display device 330 by a video application running on device 320. A video 400 displays a current playback position of a video data stream being played by the video application. Video controls 410 (pause/play button) and slide bar 415 allow user control and user movements of the current playback position. Alternate embodiments include step and/or skip back and forward functions, fast forward, fast rewind, go to start, go to end, jump to next index point, jump to last index point, and any other type of control that might be associated with a video playback device. Slide bar 415 is displayed in conjunction with a timeline (0:00. .33:30, for example) which provides timing marks indicating approximate positions of the video in correspondence to other points in the video. Alternatively, instead of an entire video segment being displayed on the timeline, any selected portions of the video may be represented on the timeline.

Darkened portion 420 represents a set of frames or positions within the video in close proximity to the current playback position of the video. Darkened portion 420 includes an indicator of a more precise point 425 indicating the current video playback position. In this example, the locations/frames of the playback video corresponding to the darkened portion represent time, periods from approximately 14:56 to 18:22. This portion of the video has been summarized and keyframes have been selected (keyframes here being referred to as selected frames using any method for determining a frame to utilize as a snap image for referencing positions in the video). The section of video that has been summarized and keyframes selected originated from any of the full video channel received of the video, or video data received via one or more look-ahead/look-behind channels. Since the look-ahead/look-behind channels are utilized to produce snap images for reference only, it is preferred that such channels be low bandwidth channels with reduced framerate, resolution or other qualities that allow a fast transfer of that data in order to quickly produce the needed snap images for reference while the video is being played. However, if sufficient bandwidth is available, full resolution connections may be used to retrieve the look ahead/back data.

Snap images 1440, 1445, 1450, and 1460 represent images at respective timeframes in the video being played back and, in accordance with one embodiment of the present invention, are associated only with frames in a close proximity to the current playback position 425 as indicated by a position of slide bar 415. However, other embodiments of the present invention may select keyframes or other pertinent frames or portions of the video being played back from a wider range of positions in the video being played back. (For example, in one embodiment, keyframes may be selected from the entire video clip.) However, the present inventors have found selecting frames from a close proximity to a current playback position provides meaningful and useful information for a user navigating the video clip. (For example, by providing more details around a current position of the video being played back, instead of wasting limited space to show positions of the video being played back that are less relevant to a point of the video currently under review).

In one embodiment, the reference snaps are updated at predetermined intervals that keep pace with a general speed of playback of the video. For example, if updates occur at an interval of every 20 seconds (approximately), all video data in close proximity to the current playback position is summarized, keyframes are selected and new snaps are redisplayed on the video player within that time period (approximately). In an alternative embodiment, each of the snaps are updated in real time and/or continuously such that any one of the snaps 1440-1460 are replaced, with other keyframes at any time the other keyframes becomes more relevant and occur within a close proximity to the current playback position. In yet another alternative, the low resolution connection(s) are utilized to continuously feed playback positions at predetermined intervals forward and reverse of the current playback position, and the snaps are low resolution moving snaps near the current video playback position.

Figure 5:
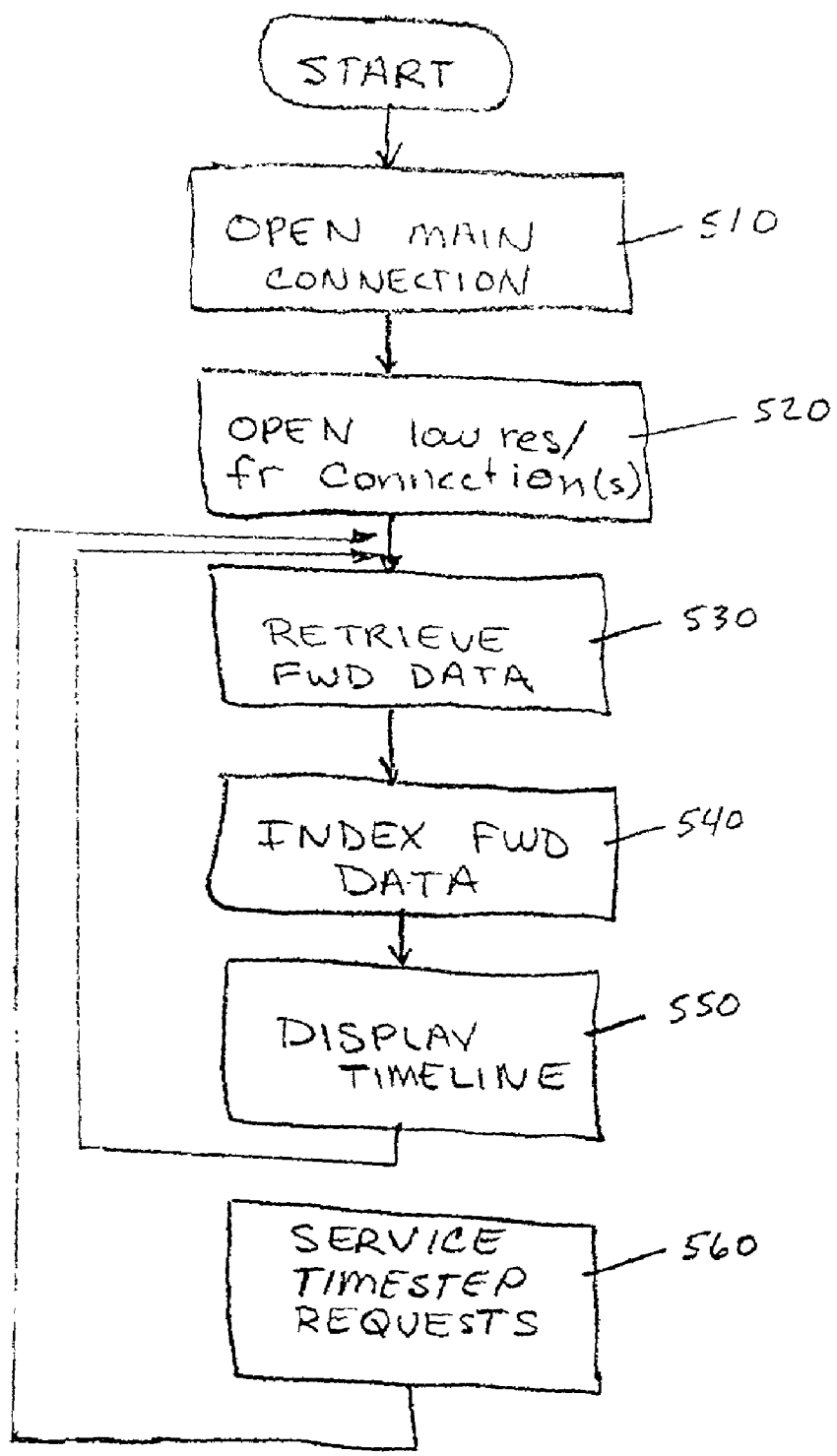
FIG. 5 is a flow chart of a process according to an embodiment of the present invention.

FIG. 5 is a flow chart of a process according to one embodiment of the present invention. At step 510, a main connection is opened from a video playback device to a video server. Exact mechanisms by which the main connection is opened and/or the devices which provide the main connection (server, or other program whether local or remote) are not particularly important. What matters is that a connection is made which brings a video to the video playback device for display to a user. At step 520, one or more low resolution (low resolution in this case referring to a reduced data rate, whether it be video resolution, video size, video framerate (fr), etc.). The low resolution connections provide either look-ahead or look-behind data from a current position of the video being played back. At step 530, the forward data is retrieved, and at step 540 the forward data is indexed. Step 530 may also include indexing and summarization of previous data (from either data played via the main connection, or retrieved from a look-behind connection).

At step 550 the timeline is displayed. The index data (which includes selected frames, keyframes, for example) are displayed in reference to the timeline as the video progresses.

Steps 530, 540 and 550 are repeated to keep the reference snap frames current relative to the playback position of the video. As discussed above, the snap selected may be made selected from points in the video in close proximity to the current playback position, or at predetermined points in front and behind the current playback position, or any selected positions.

Step 560 illustrates a process for servicing timestep requests from a user. The user performs a fast find, reverse or other timestep operation (step 560), and steps 530, 540, and 560 are repeated for the new position of the video (or other data stream). Thus, initiating redisplay of the forward and/or reverse data updated according to the new video position.

FIG. 5 illustrates one flow diagram for performing the processes according to the present invention. However, based on the present disclosure, many different flows or configurations may be utilized in order to practice the various embodiments and aspects of the present invention, FIG. 5 representing a general overall view of one embodiment.

Figure 6:
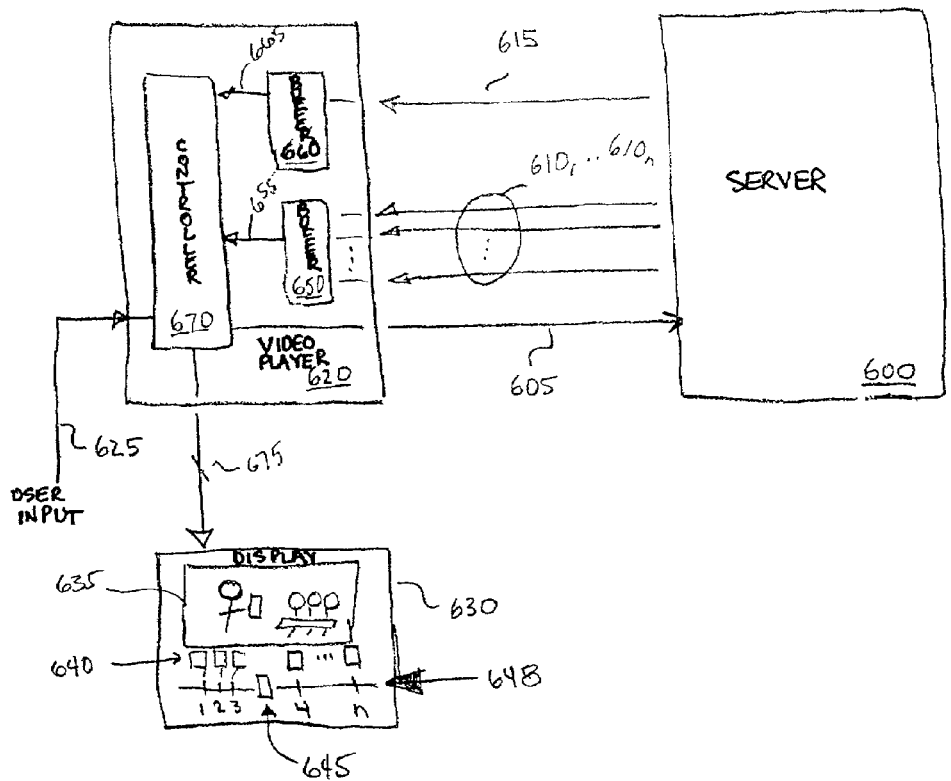
FIG. 6 is a block diagram of a device and information flow according to an embodiment of the present invention.

FIG. 6 is a block diagram of a device and information flow according to another embodiment of the present invention. A server device 600 streams video data 615 a device 620. A buffer 660 captures the video data streamed and provides buffering for smooth transitions between packets that may be delivered at varying rates and provides a smooth stream of data 665 to a control device 670. User inputs 625 are input to the control device 670 and a final video stream and other data are sent to a display device 630. Video stream 675 includes other data, such as snaps indexed from past portions of video received, and forward-looking data received over low-resolution channels 610.1..610.n. The low-resolution channels are input into a buffer device 650 that buffers low-resolution channels to provide a smooth flow of data 655 to the control device 670. Alternatively, the buffer(s) 650 may provide enough storage area such that an entire video, at low resolution, may be stored and retrieved at any time for use in indexing via channel 655. The control device 670 performs indexing and frame selection of the video data received (via flow 665, or channel 665), and selected snaps from that index and keyframe selection process are included in data flow 675 to display device 630. The display on display device 630 includes a main video window 635, snaps 640, slide bar 645 for adjusting the current video playback position, and a timeline 648 that provides reference markers for the various snaps.

Figure 7:
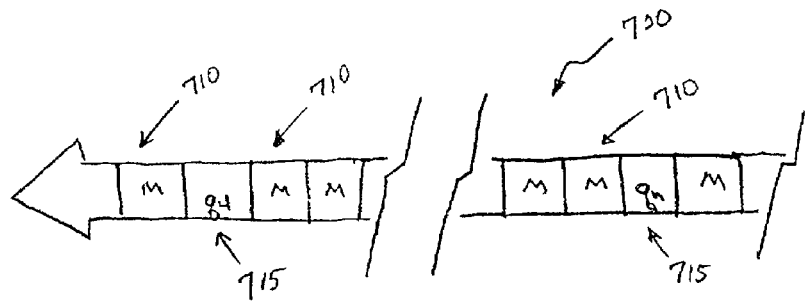
FIG. 7 is an example of a multiplexed data flow for transporting hi-resolution and low resolution connections.

FIG. 7 illustrates an example data connection 700 for transmitting a main channel (315, 615, for example), and low resolution connection(s) (610$_1$..610$_n$, 310). The data connection includes a sequence of packets for both the main channel M 710 and the low resolution connection(s) 715. Alternatively, many different configurations of multiplexing-type arrangements to share data over a single line or provide separate lines for each of the channels (main or auxiliary channels low resolution), may be provided. FIGS. 3, 6, and 7 only providing examples of how these may be implemented, either over separate physical lines or on a single multiplexed line.

After setting up the main and low resolution channels, any number of methods may be utilized to identify a current position and select positions for forward or reverse channels of the video. The server side, 600, for example, knows what video is being played and the position of that video, and the server side automatically streams and may be set up to automatically stream the appropriate low-resolution stream surrounding the current playback position (either forward or reverse). The appropriate low-resolution positions may be determined by a plus/minus amount of time, number of frames, amount of data, etc., any parameter that can be set to indicate a range within the video being played may be utilized.

Alternatively, records sent to the server side via channel 605 may indicate the video source and playback positions for any of the main channel or any of the forward or reverse channels. The server 600 maintains programs and/or devices to read the request records and send the requested portions of video to the requesting device. The request records may be re-submitted to the server as the video position updates. In addition, upon invocation of a time step request such as a fast forward or skip forward command (for example, selecting one of the snaps, by double-clicking or other selection mechanism, indicating that the user wishes to jump to that position in the video), the request records are again re-submitted to the server. Alternatively, a range may be sent to the server and the server automatically sends data over the low resolution channels encompassing the range surrounding the current playback position.

Figure 8:
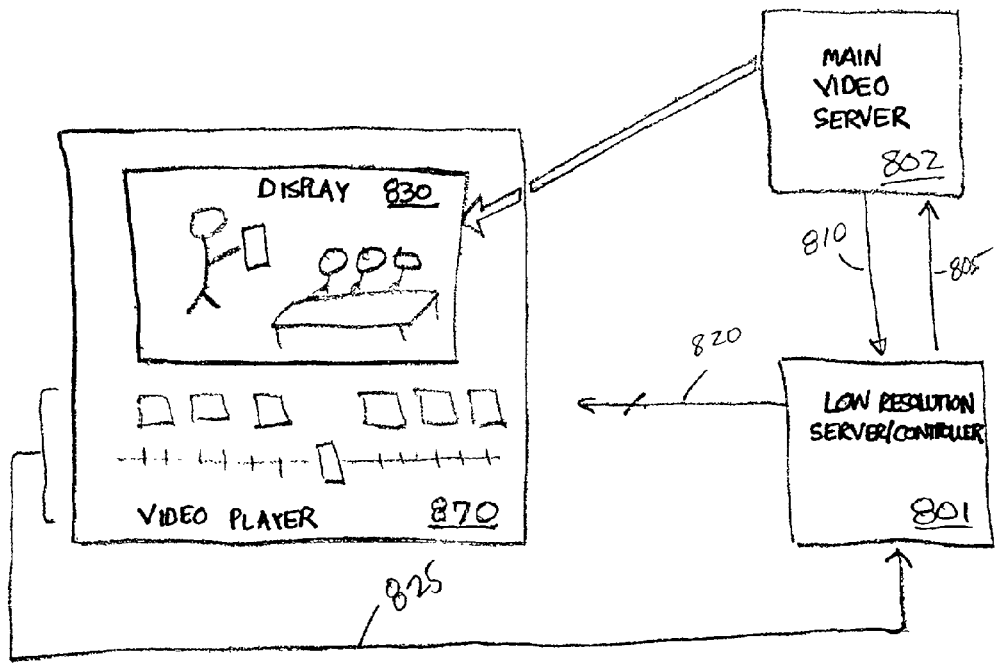
FIG. 8 is a block diagram and information flow of one embodiment of the present invention using a video server and a controller server.

FIG. 8 is a block diagram of another embodiment of the present invention where the server side functions are split between two devices. A controlling mechanism 801 receives user control functions 825 (user commands) for controlling a video (control functions such as select/start video, fast forward, reverse, skip, etc.). A main video server 802 receives commands 805 identifying a video and position and then streams the video being viewed back to control device 870 and onto display 830. Main video server 802 also sends low-resolution video 810 to server device 801 where the low-resolution images are indexed and sent to control device 870 via channel 820. Alternative embodiments of the present invention may provide these processes and functions combined in a single device (320, for example), or divided across multiple platforms (in a network environment, for example) and not depart from the scope of the present invention.

Figure 9:
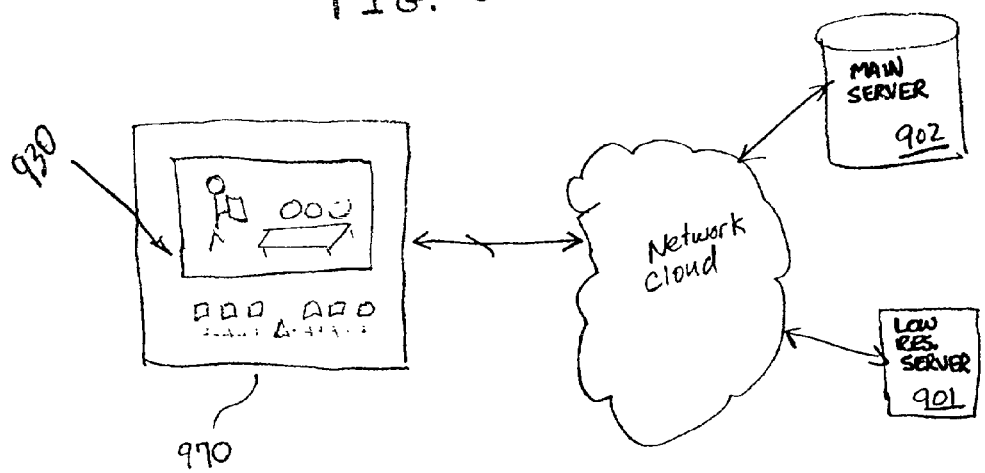
FIG. 9 is an example of network related connections and communications that may be utilized by the present invention.
Figure 1:
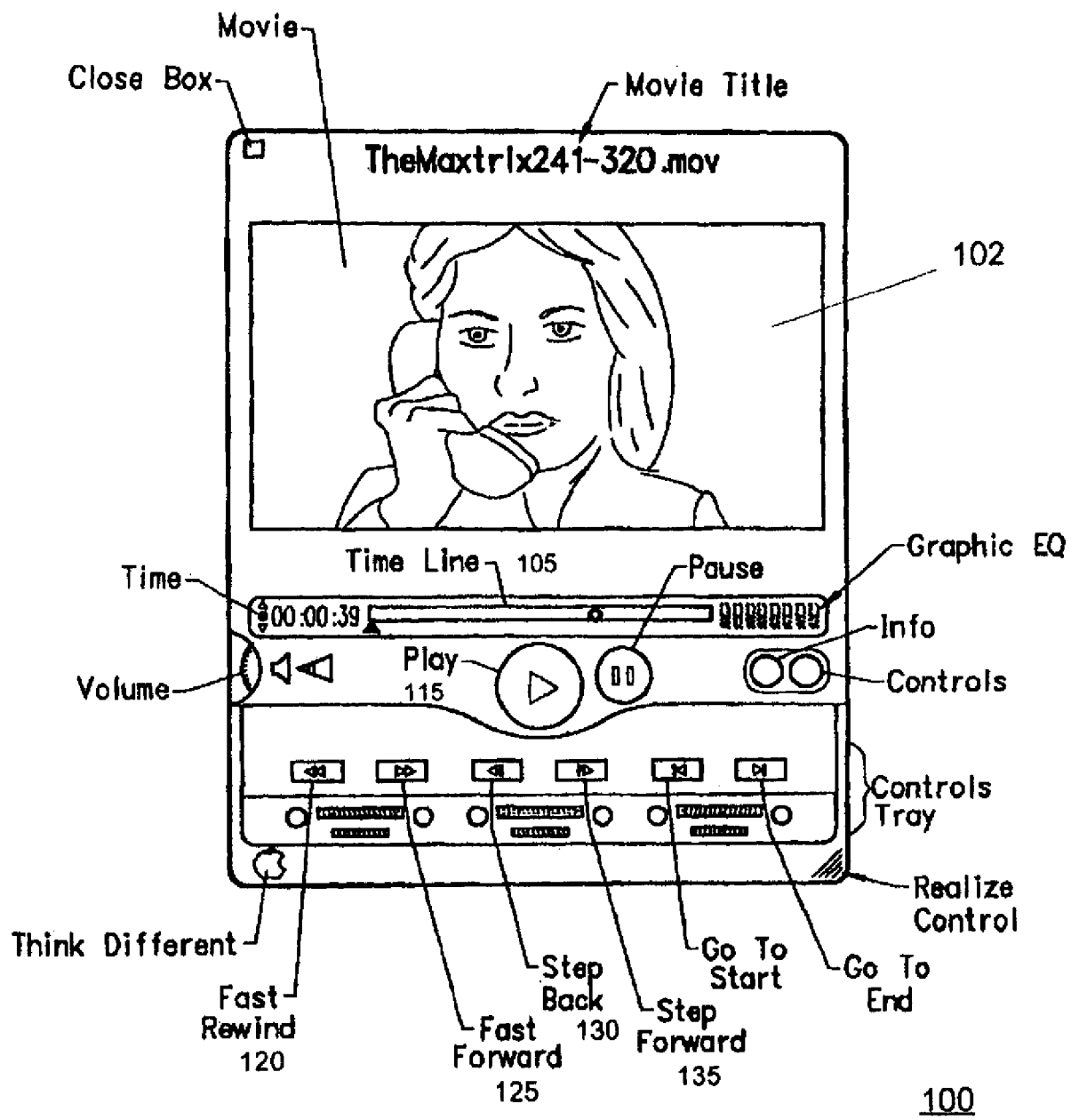
Figure 2:
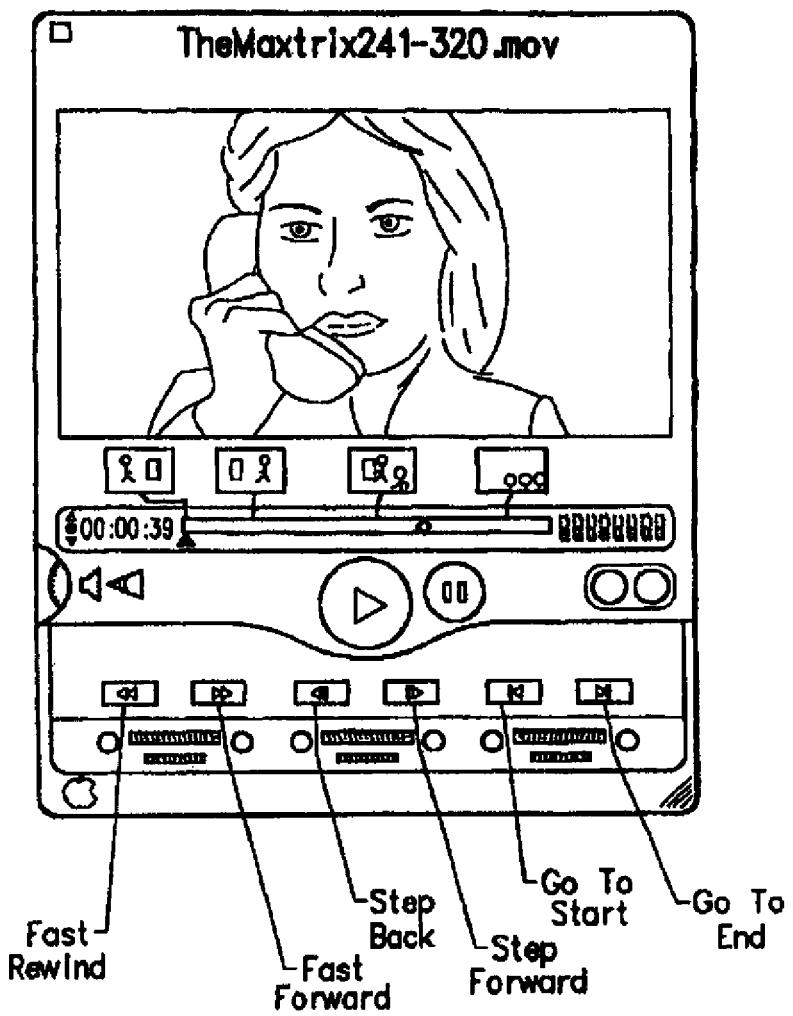
Figure 3:
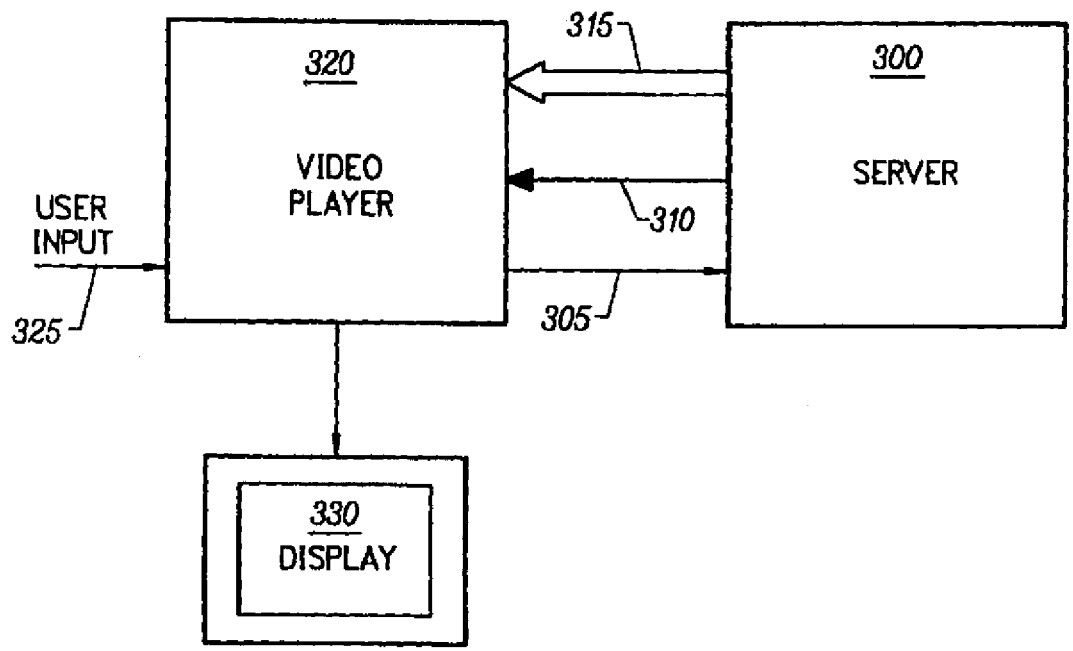
Figure 4:
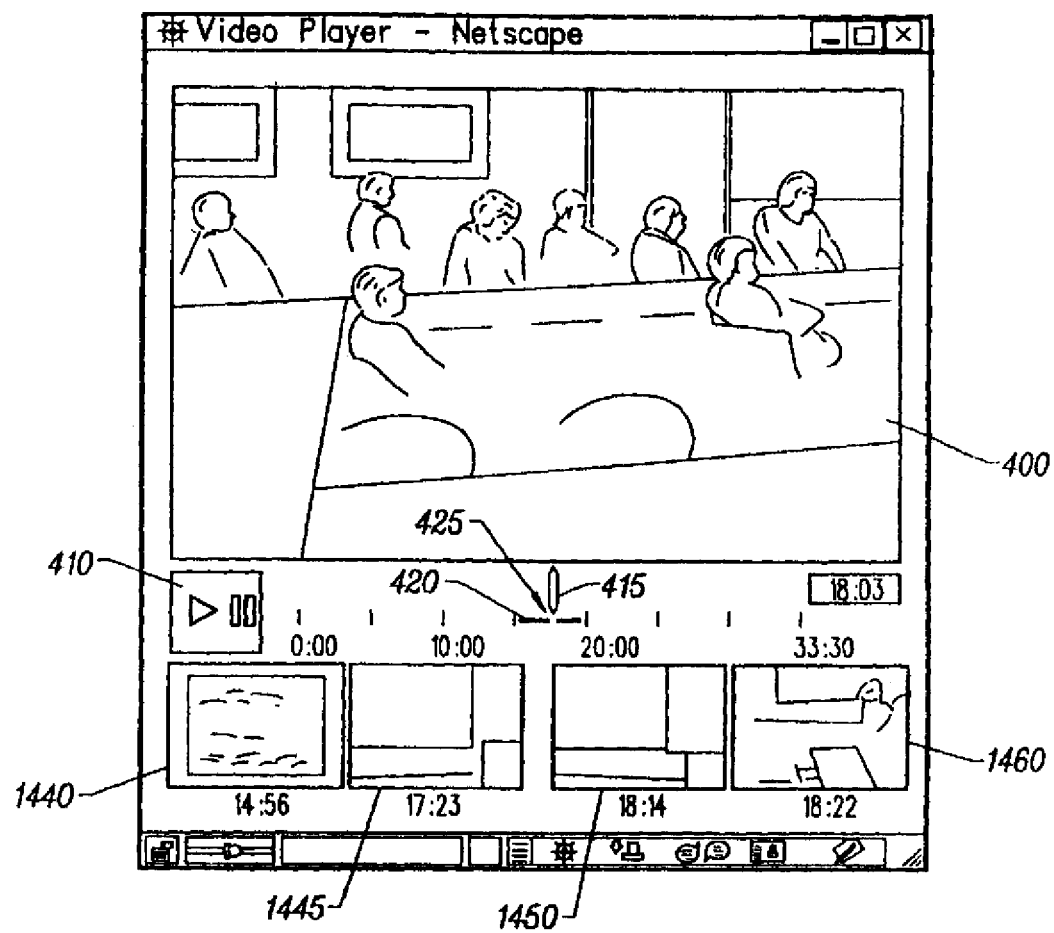
Figure 5:
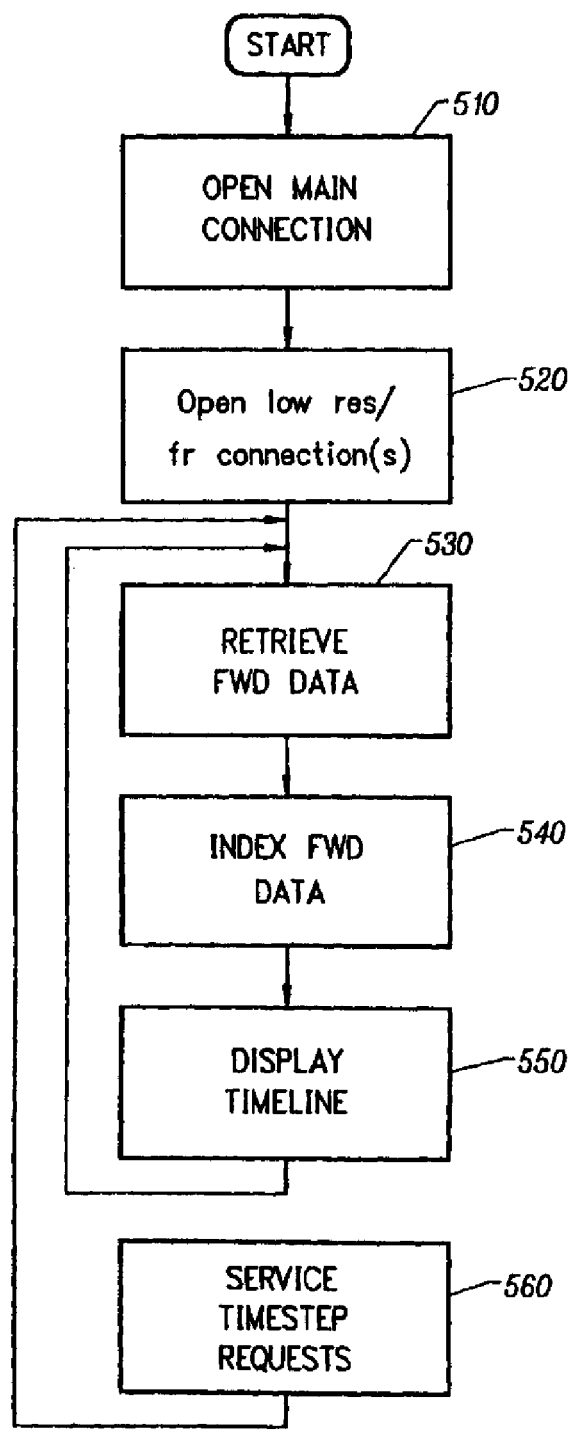
Figure 6:
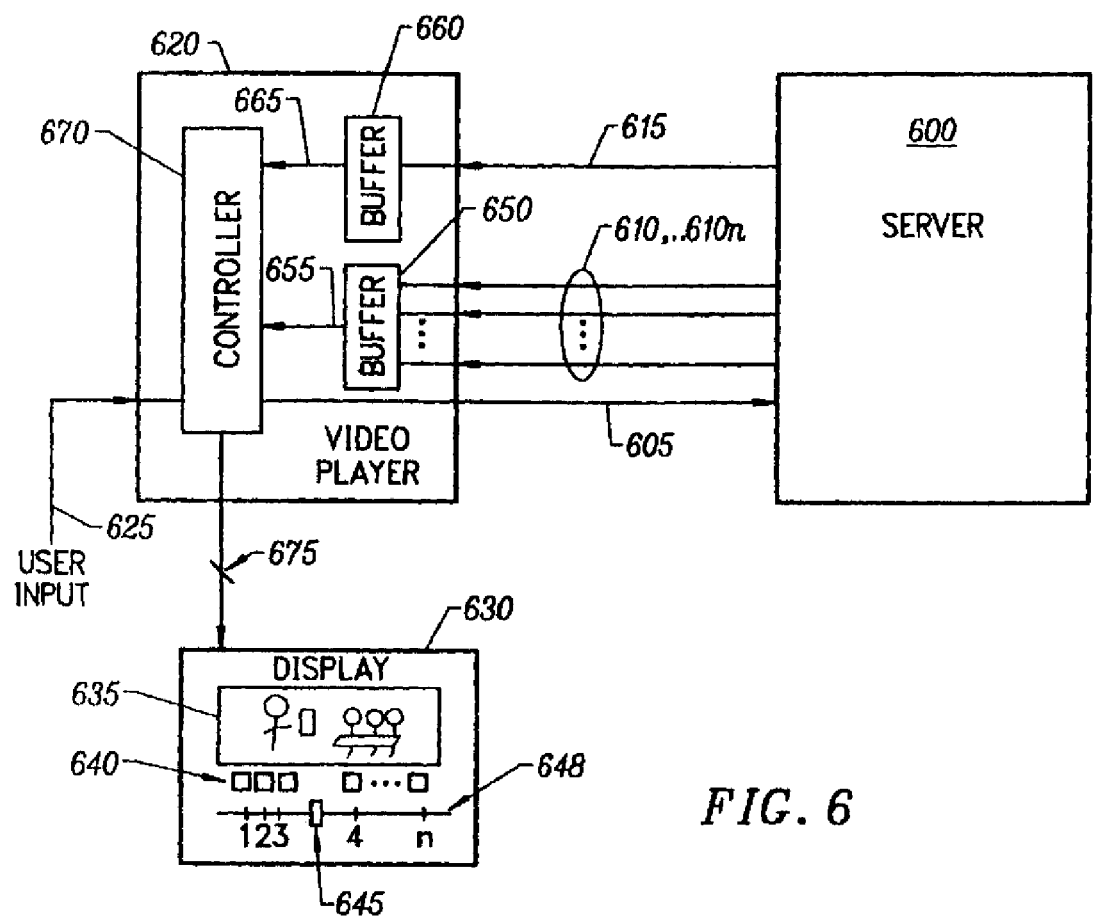
Figure 7:
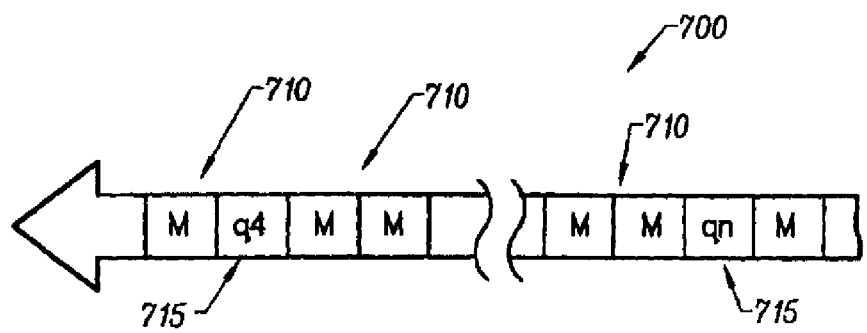
Figure 8:
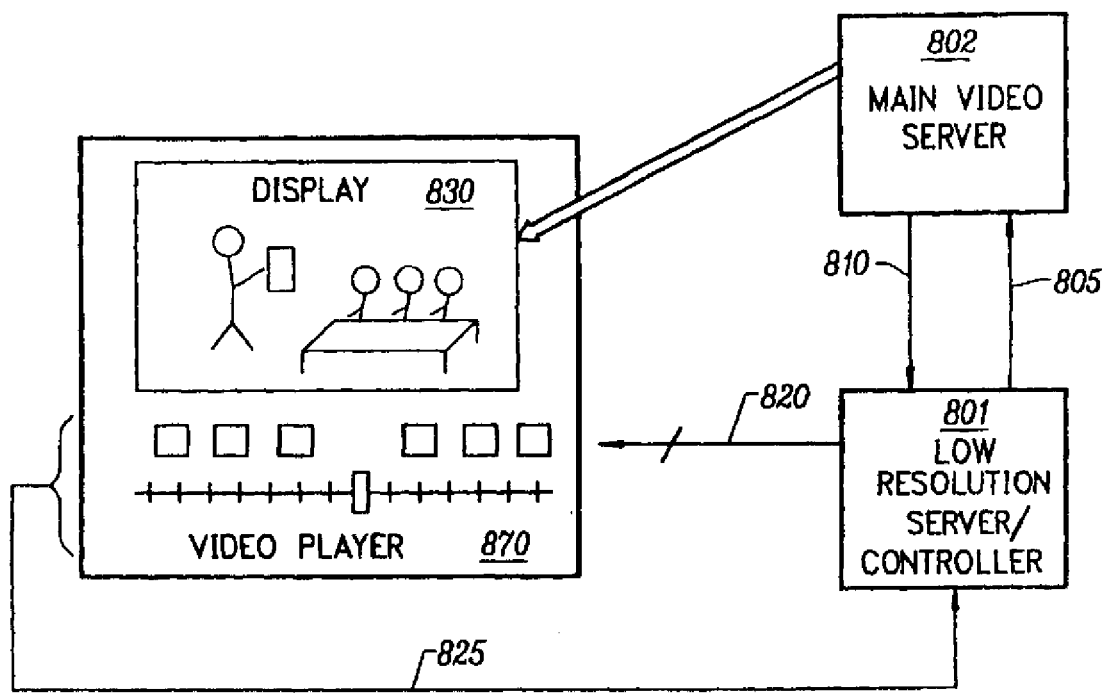
Figure 9:
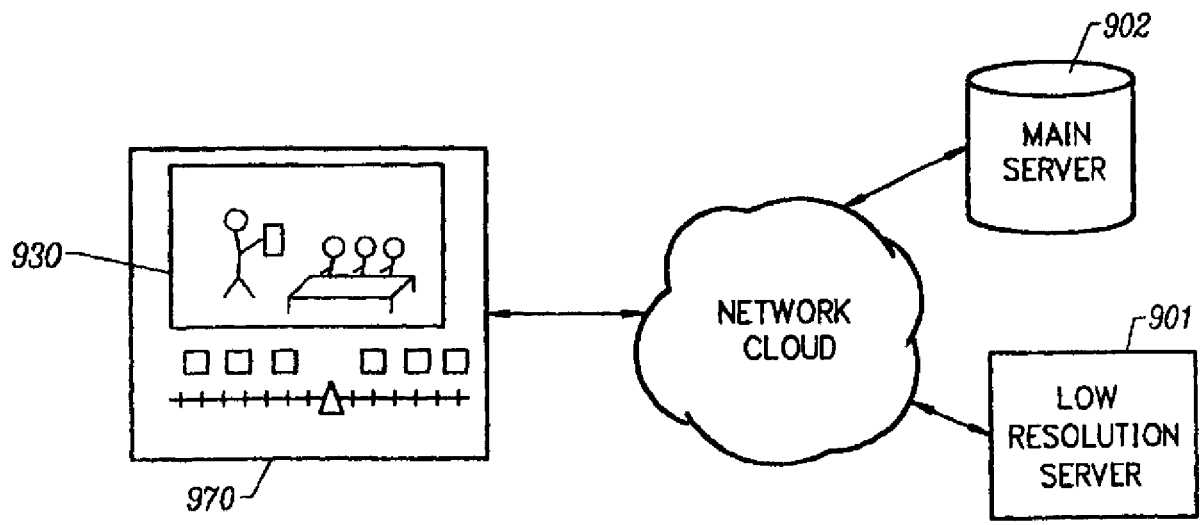

FIG. 9 illustrates a network embodiment of the present invention using two devices for indexing and streaming video. Device 901 performs the functions of indexing low-resolution video and sending snaps to control device 970, and video server 902 streams the video being watched to the control device 970 and streams low-resolution video to device 901. Communications between each of the control device 970 and server 901 and video server 902 are performed via network communications, such as TCP/IP over the Internet. Any type of communication method may be utilized, including local area network, wide area network, Internet, token ring, etc. Also illustrated is display 930.

Even with the use of two streams, only a portion of the video may be known in the middle of the playback. This rules out video indexing approaches that need to have access to the whole video such as the clustering technique mentioned above. A simple approach that only considers changes between subsequent frames can segment the video sufficiently well. The genetic algorithm described in Chiu, P., Girgensohn, A., Polak, W., Rieffel, E., Wilcox, L. "A Genetic Algorithm for Summarizing Image Document Streams and Video Keyframe Selection", FXPAL-IP-99-010 is specifically designed for finding incremental sets of keyframes and should work very well for client-side video indexing.

User navigation can interfere with client-side indexing. After a skip, the low resolution stream(s) need to skip as -well. For a short period of time, there may be insufficient information to provide index points later in the video so that the skip controls have to be grayed out. After a segment has been identified, the skip control can be enabled again. Furthermore, a skip might also produce a situation where insufficient information for index points before the playback position is available. In that situation, index points will only become available again once the playback has advanced to the next segment. As an alternative, a third stream can be opened for a short time to collect information before the current playback position. The use of a third stream would make index points available more quickly.

User Interface for Navigating the Video

Many video players provide either skip buttons that allow a jump to a different place in the video as indicated in Girgensohn, A. and Boreczky, J. "Time-Constrained Keyframe Selection Technique"; and in IEEE Multimedia Systems '99, IEEE Computer Society, vol. 1, pp. 756-761, 1999, or the button allows selection from a collection of keyframes that provide access points into different parts of the video as detailed in Zhang, H. J., Low, C. Y., Smoliar, S., Wu, J. H. "Video Parsing, Retrieval, and Browsing: An Integrated and Content-based Solution", Proc. Multimedia '95, ACM Press, pp. 15-24. The problem with the former approach is that there is no feedback where the jump might lead. The latter approach typically uses a large number of keyframes.

In contrast to these approaches, the present invention provides a design with a small number of skip controls that each show or are associated with a representative keyframe of the segment to be jumped to. This approach overcomes the problems of both approaches described above. During video playback, the segments around the segment currently being played are accessible via the controls. When the playback crosses a segment boundary, the access points of the skip controls and their keyframes are updated. The number of skip controls can be adjusted to match the available screen real estate and the user preferences. Common layouts might use two controls for accessing the segments directly before and after the current segment or four controls to expand the accessible region. Color-coding of the controls and visualizing the corresponding segment in the timeline with that color will provide a quick reference for the duration of the accessible segments and their distance from the current position in the video (see FIG. 1). The start time of each segment is shown below the control to provide another representation for the placement of segments.

The user interface for navigating the video described works best when the video is segmented with a video indexing technique. A number of different techniques can be used to segment the complete video on the server side. One possible approach is the one used in the a system (Uchihashi, S. and Foote, J., "Summarizing Video Using a Shot Importance Measure and a Frame-Packing Algorithm," in Proc. ICASSP '99, Vol. 6, pp. 3041-3044, 1999) that segments the video after clustering the video frames with a hierarchical agglomerative clustering technique. Other approaches described in the literature can be used as well. If the video is streamed and no server-side index exists, the client-side video indexing technique described above can be used.

Included in the present invention is the provision of (1) client side indexing of streamed video; and (2) associating keyframes and timeline segment display with the skip forward/backward functions in a media player (for example, clicking on skip forward moves the current playback position to a point on the timeline associated with the next keyframe displayed).

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMS, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to capturing and indexing media streams, producing a timeline and linking selected frames to the timeline, linking selected frames to points in or segments of a media stream, providing control commands to the media stream based on user-selected frames (snaps), and communication of results according to the processes of the present invention.

Numerous modifications and variations of the present invention are possible in light of the above teachings. It is therefore to be understood that within the scope of the appended claims, the invention may be practiced otherwise than as specifically described herein.

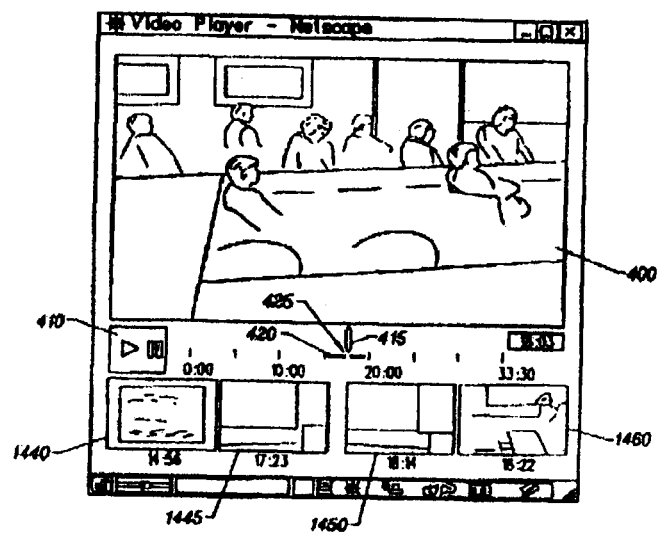

What is claimed is:

1. A method for providing on-the-fly client-side indexing and navigation of video data, comprising the steps of:
    opening a main connection for a client-side device to receive transmissions of a data flow, wherein said data flow is not indexed;
    opening a second connection for the client-side device to receive at least one look-x data stream comprising a plurality of data from said data flow, wherein said plurality of data is not indexed such that no frames in said data flow have been associated with any points in the look-x data stream;
    indexing with the client-side device at least one point of the look-x data stream to at least one corresponding point in said data flow, wherein said indexing step with the client-side device further comprises determining a particular timeframe in said data flow and selecting on-the-fly at least one look-x point for display to represent the at least one corresponding point in said data flow at said particular timeframe and wherein selecting on-the-fly step includes automatically and without user intervention associating the look-x point with the point in said data flow while said data flow and said look-x data stream are being received at the client-side device; and
    providing control of a playback position of said data flow based on the indexed points in the look-x data stream.

2. The method of claim 1, further comprising the step of:
    displaying a timeline corresponding to the indexed look-x points, the timeline having at least one of said indexed look-x points displayed so as to reference a position on said timeline.

3. The method of claim 1, wherein said step of providing control includes the step of:
    displaying at least one of a skip forward and a skip back button configured to step a play position of said data flow to a position corresponding to a respective one of a next and a previous of said look-x data points relative to the current play position of said data flow.

4. The method of claim 1, further comprising the steps of:
    displaying a timeline having representations of the indexed points;
    selecting at least one of the indexed points; and
    displaying said data flow at a point beginning with the selected indexed point.

5. The method of claim 1, wherein said data flow is a video and said look-x points are frames of said data flow retrieved from one of said main connection and said second connection.

6. The method of claim 1, wherein said second connection is a low resolution connection relative to the main connection.

7. The method of claim 1, further comprising the step of:
    selecting a predetermined number of said indexed look-x points;
    displaying the predetermined number of indexed points to provide reference for a playback control mechanism; and
    updating the selected predetermined number of indexed look-x points based on an update criteria.

8. The method of claim 7, wherein said step of selecting includes the step of:
    selecting said predetermined number of look-x points such that each of the look-x points is within a predetermined distance of a first play position of said data flow.

9. The method of claim 7, wherein said update criteria comprises a change of the playback position a predetermined amount from the first play position during the selection step.

10. A device for client-side video indexing, comprising:
    a video player comprising:
        a client-side main data stream connection for receiving transmissions of a non-indexed data flow;
        a client-side look-x data stream connection for receiving at least one non-indexed look-x data transmission of the data flow wherein no frames in said data flow have been associated with any points in the look-x data stream;
        a client-side controller adapted to index on-the-fly at least one look-x point of the look-x data stream to a corresponding at least one point in said data flow by summarizing the look-x data stream and generating for display the at least one look-x point to the corresponding at least one point in said data flow wherein indexing on-the-fly step includes automatically, and without requiring user input, associating the look-x point with the point in said data flow while said data flow and said look-x data stream are being received at the client-side device; and
    a display for displaying at least one of the indexed look-x points.

11. The device of claim 10, wherein the video player further comprises:

a skip forward button and a skip back button that each step a play position of said data stream to a respective one of a next and a previous of said look-x points relative to the current play position of said data stream.

12. The device of claim 10, wherein the display further comprises display of a timeline referenced to the data flow and at least one of said indexed look-x points, the indexed look-x points each displayed so as to reference a position on said timeline.

13. The device of claim 10, wherein the video player device further comprises:
a select button for allowing a user to select at least one of the indexed look-x points enabling display of the data flow to begin at the selected indexed point.

14. The device of claim 10, wherein said look-x data stream connection is a low resolution data stream relative to the main data stream connection.

15. A method for client-side navigating and indexing of video data, comprising the steps of:
opening a client-side main connection for receiving a video stream without an existing index;
opening a client-side second connection for receiving transmission of at least one look-x data stream without an existing index, such that no frames in said video stream have been associated with any points in the look-x data stream;
generating on-the-fly on the client-side an index, the index comprising at least one look-x data point and relating said at least one look-x data point to at least one point corresponding in time within said data flow wherein the generating on-the-fly step includes automatically, and without requiring user intervention, associating the look-x data point with the point in time within said data flow while said data flow and said look-x data stream are being received at the client-side; and
providing control of a playback position of said data flow based on at least one user-selected look-x data point corresponding to at least one of the indexed points in the look-x data stream.

16. A method for indexing and navigating a video stream, the method comprising:

opening a client-side connection to receive a main video stream;
opening at least another client-side connection to receive at least one look-x data stream of the main video stream such that no frames in said video stream have been associated with any points in the look-x data stream;
generating at least one keyframe at the client side that references at least one corresponding timeframe point in the main video stream, wherein the generating step results in an index created on-the-fly on the client side and wherein the generating step includes automatically, and without requiring user input, associating the timeframe point with the keyframe while said data flow and said look-x data stream are being received at the client-side;
displaying the at least one keyframe to a user;
providing control of a playback position of said main video stream based on the at least one keyframe that references the at least one corresponding point in the main video stream; and
updating the generating and displaying steps to keep pace with a general speed of playback of the main video stream.

17. The method as in claim 16 wherein the updating step is performed in at least one of real time and continuously.

18. The method as in claim 16 further comprising using the look-x data stream to feed playback positions continuously at pre-determined intervals forward and reverse of a current playback position of the main video stream; and the generating step further comprises generating low resolution moving snaps near the current playback position of the main video stream.

19. The method of claim 1, further comprising:
opening a third connection for a client-side device to receive information before said playback position in said data flow.

20. The method of claim 1, further comprising:
reaching a segment boundary in said data flow; and
updating the control of said playback position in said data flow upon reaching said segment boundary.

* * * * *

UNITED STATES PATENT AND TRADEMARK OFFICE
CERTIFICATE OF CORRECTION

PATENT NO. : 7,401,351 B2 Page 1 of 9
APPLICATION NO. : 09/738905
DATED : July 15, 2008
INVENTOR(S) : John Boreczky et al.

It is certified that error appears in the above-identified patent and that said Letters Patent is hereby corrected as shown below:

The title page showing an illustrative figure, should be deleted and substitute therefor the attached title page.

The sheets of drawings consisting of figures 1-9 should be deleted and substitute therefor the attached figures 1-9.

Signed and Sealed this

Twenty-seventh Day of July, 2010

David J. Kappos
*Director of the United States Patent and Trademark Office*

CERTIFICATE OF CORRECTION (continued)

(12) United States Patent
Boreczky et al.

(10) Patent No.: US 7,401,351 B2
(45) Date of Patent: Jul. 15, 2008

(54) SYSTEM AND METHOD FOR VIDEO NAVIGATION AND CLIENT SIDE INDEXING

(75) Inventors: John Boreczky, San Leandro, CA (US); Andreas Girgensohn, Menlo Park, CA (US); Lynn Wilcox, Palo Alto, CA (US); William N. Schilit, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1101 days.

(21) Appl. No.: 09/738,905

(22) Filed: Dec. 14, 2000

(65) Prior Publication Data

US 2002/0075572 A1   Jun. 20, 2002

(51) Int. Cl.
*H04N 7/173* (2006.01)

(52) U.S. Cl. ............... 725/88; 725/89; 725/90; 725/93

(58) Field of Classification Search .......... 725/86–95; 345/721, 723–725
See application file for complete search history.

(56) References Cited

U.S. PATENT DOCUMENTS

| | | | | |
|---|---|---|---|---|
| 5,136,655 | A | * | 8/1992 | Bronson ............ 704/270 |
| 5,818,439 | A | | 10/1998 | Nagasaka et al. |
| 5,884,056 | A | * | 3/1999 | Steele ............ 345/738 |
| 6,222,532 | B1 | * | 4/2001 | Ceccarelli ............ 345/723 |
| 6,366,296 | B1 | | 4/2002 | Boreczky et al. |
| 6,711,741 | B2 | * | 3/2004 | Yeo ............ 725/87 |
| 6,721,490 | B1 | * | 4/2004 | Yao et al. ............ 386/69 |

OTHER PUBLICATIONS

U.S. Appl. No. 09/266,637, filed Mar. 11, 1999, Foote et al.
U.S. Appl. No. 09/267,529, filed Mar. 12, 1999, Uchihashi et al.
U.S. Appl. No. 09/322,842, filed May 28, 1999, Girgensohn et al.
U.S. Appl. No. 09/611,389, Chiu et al.
Arman, F., et al., "Content-based Browsing of Video Sequences," *In Proceedings of the 6th ACM International Conference on Multimedia*, San Francisco, California (1994) pp. 97-103.
Borecxky, J., et al., "Comparison of Video Shot Boundary Detection Techniques," *In Storage and Retrieval for Still Image and Video Databases IV, Proc. SPIE 2670*, San Jose, California (1996) pp. 170-179.

(Continued)

*Primary Examiner*—Hunter B. Lonsberry
(74) *Attorney, Agent, or Firm*—Fliesler Meyer LLP

(57) ABSTRACT

A system is provided where a number of representative video snapshots are displayed on a timeline indicating a position to jump to in a video using control buttons, such as fast forward, reverse, or a timeline scroll bar. The video snapshots are obtained by opening a low resolution connection to a video server to receive forward looking video segments. The forward looking video segments are summarized and the representative video snapshots are selected and displayed to provide a reference frame for the user to select a timeline position, or snapshots directly linked to positions in the higher resolution video. Backward looking video segments may be similarly summarized from the low resolution connection, or alternatively from video previously played. As the video progresses, new forward looking video segments are received and new representative video snapshots are summarized and displayed in close proximity with the video being played.

20 Claims, 7 Drawing Sheets